May 12, 1964
C. PIECK ET AL
3,132,503
ANTI-THEFT LOCK DEVICE
Filed Jan. 23, 1961
2 Sheets-Sheet 1
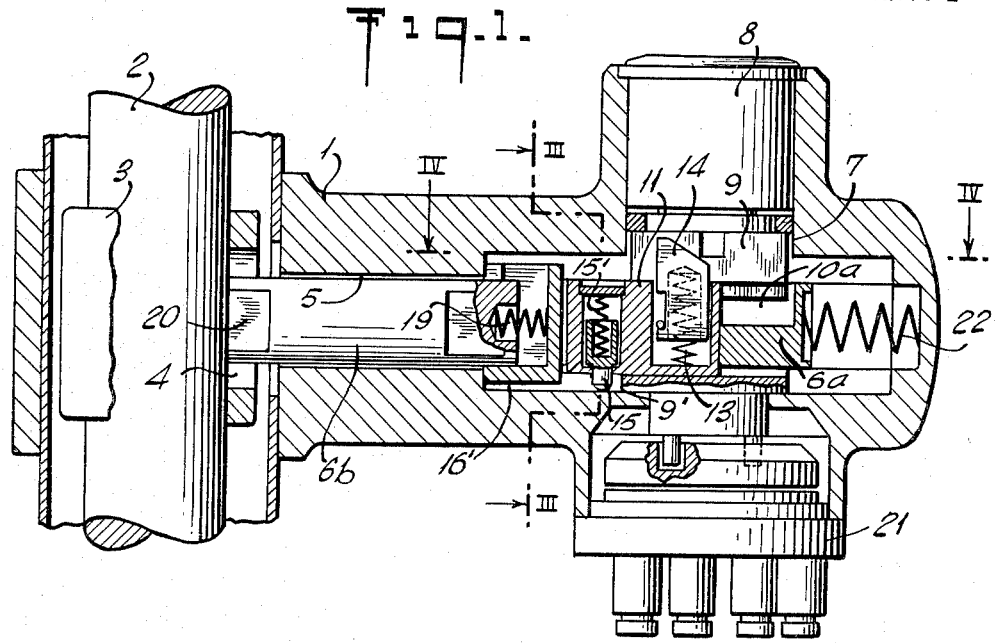
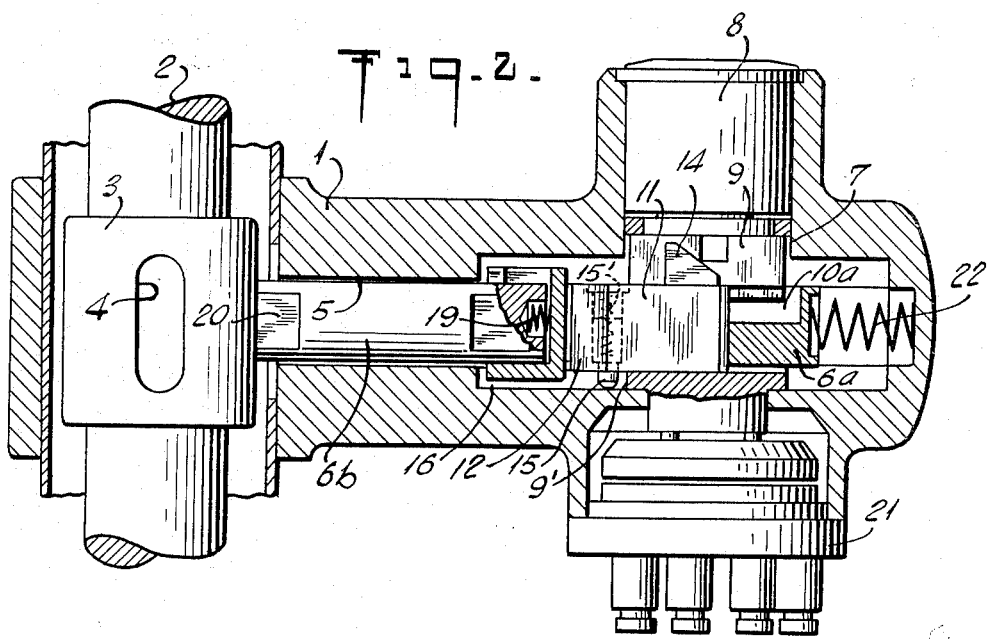
INVENTORS
CHRISTIAN PIECK
GUENTER SCHAUMBURG
BY
Nolte & Nolte
ATTORNEYS May 12, 1964 C. PIECK ET AL 3,132,503
ANTI-THEFT LOCK DEVICE
Filed Jan. 23, 1961 2 Sheets-Sheet 2
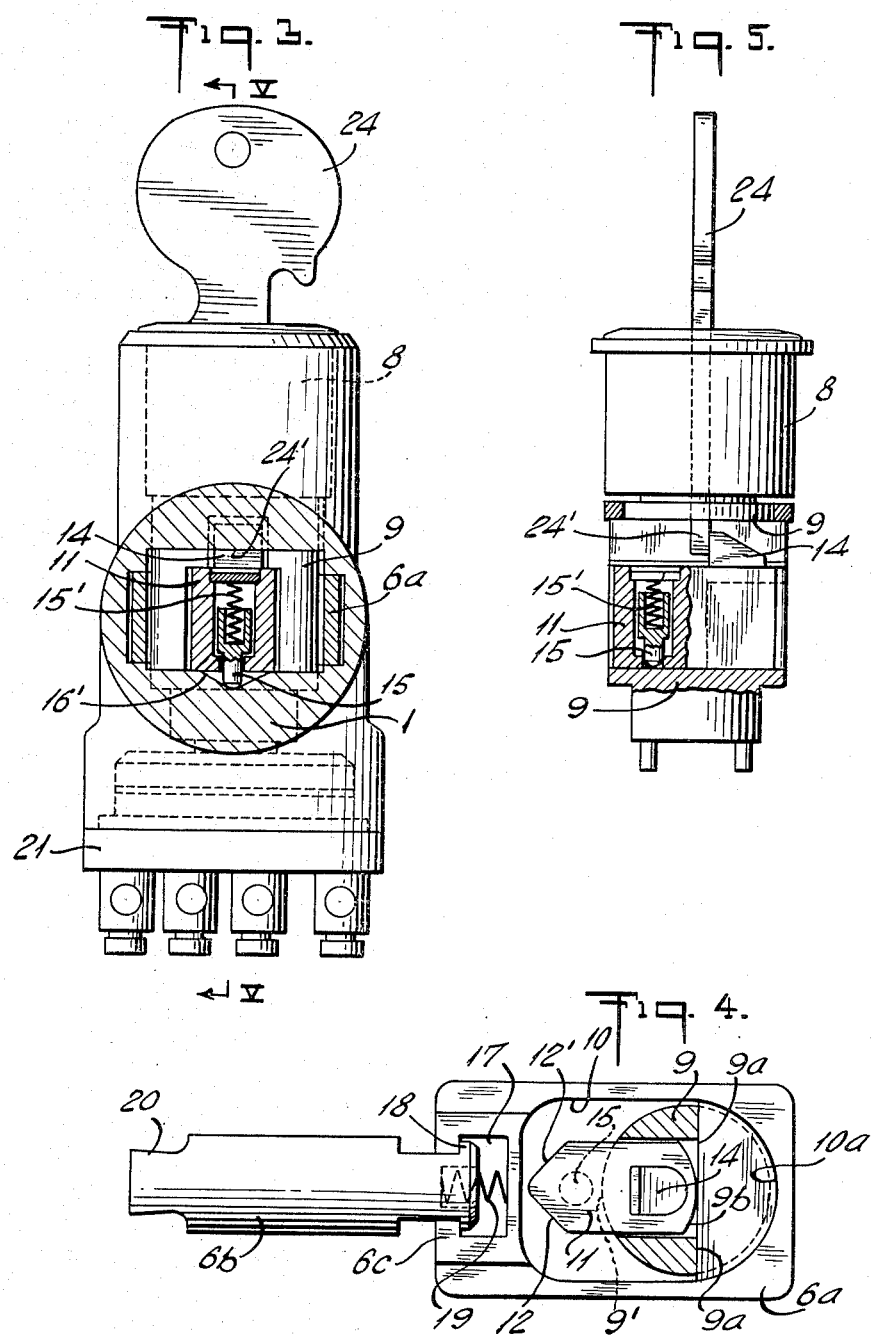
INVENTORS
CHRISTIAN PIECK
GUENTER SCHAUMBURG
BY
Nolte & Nolte
ATTORNEYS

United States Patent Office 3,132,503
Patented May 12, 1964

3,132,503
ANTI-THEFT LOCK DEVICE
Christian Pieck and Guenter Schaumburg, Wuppertal-Langerfeld, Germany, assignors to Nieman & Co. KG., Wuppertal-Langerfeld, Germany, a German limited partnership
Filed Jan. 23, 1961, Ser. No. 84,104
Claims priority, application Germany Jan. 23, 1960
3 Claims. (Cl. 70—186)

This invention relates in general to anti-theft devices and has specific reference to an anti-theft lock device for vehicles, notably automobiles. This device is of the type comprising a key-actuated or like lock controlling the opening and closing of various electrical circuits as well as the displacements of a spring loaded bolt associated with a notch-type box-staple carried by a member controlling the operation of the vehicle such as the steering pillar, the control lever of the gear box, the brake lever. Said lock controls said circuits and said bolt displacements through the medium of a cam barrel extending through said bolt in a ramp shaped cavity provided to this end.

This anti-theft device is remarkable in that said barrel comprises, in the plane of the aforesaid bolt cavity, a slide member movable in a direction at right angles to its axis of rotation and is provided with cam or protruding faces adapted to guide its movements of translation by engaging the edges of said bolt cavity. Said slide member comprises on its upper face a spring-loaded catch adapted, in a predetermined position of the lock, to engage the key end and thus lock the bolt against motion.

According to another feature characterizing this invention said slide member comprises a second spring-loaded catch, the bolt-receiving recess extending substantially in the plane of the slide member face carrying said catch and being formed with a V-shaped groove, cavity or channel. The latter is so disposed that for a given position of the lock the catch engages this cavity or channel through a rotary motion or translation and cannot be extracted therefrom unless the lock is rotated.

Other features and advantages of this invention will appear as the following description proceeds with reference to the accompanying drawings forming part of this specification and illustrating diagrammatically by way of example a typical embodiment of the anti-theft lock device of this invention.

In the drawings:
FIGURE 1 is a diagrammatic longitudinal axial section of the anti-theft lock device;
FIGURE 2 shows the same device in a similar view, the bolt being about to enter the notch of the box-staple;
FIGURE 3 is a section taken along the line III—III of FIGURE 1;
FIGURE 4 is a section taken along the line IV—IV of FIGURE 1; and
FIGURE 5 is a fragmentary longitudinal section taken along the line V—V of FIGURE 3 and showing the anti-theft lock device in the "stop" position, with the key engaged in the lock.

In the example illustrated, the anti-theft device of this invention comprises a body or case 1 secured for example on the instrument panel, dashboard or other part through which a steering column 2 is mounted. This steering column 2 has secured thereon a notch-type box-staple 3 consisting for example of a socket having an elongated hole or notch 4 formed through its wall (see FIGURE 2).

The body 1 comprises on the one hand a cavity 5 extending at right angles to the axis of the steering column and having slidably mounted therein a bolt having portions 6a, 6b, and on the other hand a recess 7 extending at right angles to the cavity 5 and containing a lock and bolt driving members. The bolt portions will be fully described hereunder.

The lock proper 8 is of any conventional or suitable type, for example of the groove type adapted to rotate a barrel 9 extending into a cavity 10 formed in the bolt portion 6a. The lock also actuates, by means of interconnecting members illustrated but not described herein in detail, switch means 21 for closing and opening electrical circuits controlling, for example, the starter motor, the ignition or other electrical apparatus and devices usually controlled from the instrument panel of the vehicle.

The barrel 9 consists of a cylinder of which the intermediate portion comprises a substantially semi-cylindrical recess (see FIGURE 4) forming a cam face 9a adapted to cooperate with the edges of the aforesaid cavity 10. This cavity is of substantially rectangular configuration, the cam face 9a acting normally upon one of the sides of this rectangle so as to cause axial displacement of the bolt. The bolt portion 6a is also formed with a semi-cylindrical recess 10a limited on one of its diameters by the recess side engaged by the cam face 9a, said recess 10a receiving the cylindrical portion of barrel 9.

This barrel 9 comprises also a slide member or like element 11 adapted to slide in a recess of 9b of said barrel in a direction at right angles to its axis of rotation. This slide member is formed with cam faces 12, 12' cooperating with the edges of the rectangular cavity 10, and carrying on its upper face a spring-loaded catch of which the head 14 is bevelled on the side registering with the cam-face 9a of barrel 9. The spring is denoted 13.

Slidably mounted in the slide member 11 is another spring-loaded catch 15 projecting from the lower face of said slide member and adapted to cooperate with a V-shaped groove, cavity or channel 16 formed in the cavity 5 for the bolt (see FIGURE 3). The spring is denoted 15'.

The wall of the cavity 5 containing this V-shaped groove 16 is substantially co-planar with that face of slide member 11 which carries the spring-loaded catch 15. Thus, when the catch 15 is carried along by the barrel 9 for rotation therewith it engages a cam face 16' of groove 16 and is pushed back completely, thus enabling the slide member 11 to slide in the barrel 9. The barrel 9 has a lower edge 9' against which the catch 15 may abut.

As illustrated in FIGURES 1, 2 and 4, and mentioned above, the bolt is made of two elements or portions 6a, 6b in relative sliding engagement, with resilient means, for example a spring 19, interposed between these elements. In the example illustrated the bolt portion 6a is the bolt driver and has formed therethrough the cavity or aperture 10 receiving the barrel 9, and this portion 6a is also formed with a T-shaped or like groove 17 slidably engaged by the T-shaped end 18 of the bolt forming element proper 6b, the spring 19 being interposed between the relevant end of bolt 6b and the bottom of this groove 17. Bolt portion 6a has narrowed ends 6c surrounding the portion 6b close to its end 18. The other end 20 of the bolt 6b is preferably of dovetail configuration so as to properly fit in the elongated hole 4 of the box-staple 3. There is also provided a conventional return member such as a spring 22 (FIGURES 1 and 2) constantly urging the bolt portions 6a, 6b to the locking outward position of the latter.

The anti-theft lock described hereinabove operates as follows:

In FIGURES 1 and 3 of the drawings the device is shown in its closed or locking position. In this position the springs 19 and 22 are expanded, the bolt end 20 engages the notch 4 of the box-staple 3 to prevent the rotation of the steering column 2. In this position it is not possible to open the lock unless the key 24 is rotated; in fact, the spring-loaded catch 15 engages the V-groove 16 formed in cavity 5 and cannot be extracted therefrom unless the barrel 9 is rotated to clear the cam face 16'.

The catch 15 is prevented from effecting a movement of axial translation by being checked by the lower edge 9' of barrel 9. Thus, the slide member 11 and the bolt are also prevented for effecting any movement of translation.

When the key 24 is introduced into the lock, its end assumes the position shown in broken lines in FIGURES 1 and 2. When the key is rotated, the barrel 9 is rotated similarly and the catch 15 clears the cam face 16 and retracts completely to permit the movement of translation of slide member 11, this movement being caused and guided by the cam faces 12, 12' formed on this slide member 11, which co-act with the edges of the cavity 10 formed in the bolt portion 6a. At the same time the cam face 9a of barrel 9 which engages the edge of cavity 10 causes the translation of bolt 6b and retracts the bolt end 20 from the box-staple 3. Similarly, the bevel-headed catch 14 carried by the slide member 11 moves bodily with this member and retracts under the tip of the key so as to pass to the opposite side of this key tip.

Of course, the switch 21 is also actuated and operates according to the sequence usually contemplated in devices of this character.

When the key 24 is restored to the "stop" position the bevel-headed catch 14 cannot retract under the key end for its non-bevelled face registers with this end. Thus, it will prevent any movement of translation of the slide member 11 and therefore keep the bolt in the open position, thus avoiding any risk of locking the steering column 2 as long as the key is not removed from the lock 8. When the key is removed from the lock its end or tip releases the catch 14 loaded by spring 13, thus alllowing the slide member 11 to accomplish a movement of translation under the influence of the spring 22 acting upon the bolt portion 6a. The bolt is thus moved and locks the device.

However in most cases, the bolt end does not register with the notch of the box-staple. This is why the bolt according to this invention is made of two portions 6a, 6b slidably engaging each other with the interposition of adequate resilient return means such as the spring 19 or the like. Thus, as shown in FIGURE 2, when the key 24 is removed from the lock 8 the bolt spring 22 is expanded and the catch 15 engages its groove 16 before the barrel 9, thus locking against movement the bolt portion 6a, but the other bolt portion 6b engaging the notch 4 of the box-staple 3 can slide in the bolt portion 6a with the interposition of said resilient spring 19 so that this locking action can be obtained before the bolt and has penetrated into the notch 4. This spring 19 is compressed until the notch 4 is brought into alignment with the bolt end 20 by rotating the steering column 2 so that the spring 19 may expand and cause the bolt end 20 to engage again the notch 4.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. An anti-theft lock device for vehicles and the like, comprising a housing adapted to be secured to a fixed part of the vehicle, a key-actuated rotatable lock in said housing, a spring-loaded bolt member slidably arranged within said housing and adapted to immobilize a portion of a control member of the vehicle in a first predetermined position of said lock, said bolt member including a first portion engageable with said control-member portion and a second aligned portion provided with a cavity having arcuate engaging surfaces, a cam barrel operatively connected to said lock and rotatable within said cavity, a slide member reciprocable within an aperture of said cam barrel and movable therewith in said cavity, one end of said slide member being formed with lateral faces adapted to contact lateral portions of said engaging surfaces when said cam barrel is rotated upon actuation of said lock, the other end of said slide member having an end face adapted to contact a transversal portion of said engaging surfaces so that rotation of said cam barrel will move said second bolt portion away from said control-member portion on effect of the slide-member movement, a first spring-loaded catch reciprocably secured to said slide member and adapted to hold said bolt member against movement upon engagement with the tip of said key in a second predetermined position of said lock, and a second spring-loaded catch slidably secured to said slide member in a spaced-apart relation with said first catch and adapted to hold said first bolt portion against movement away from said control-member portion when said key is withdrawn from said lock in said first position.

2. A lock device according to claim 1, wherein said housing is provided with a groove in the region of and substantially parallel with the movement of said second bolt portion, said second catch having the shape of a pin the outwardly biased end of which is adapted to engage said groove upon the withdrawal of said key in said first position, said slide member being thereby prevented from moving into said aperture in a direction away from said control-member portion, while upon re-insertion of said key and actuation of said lock away from said first position both said slide member and said bolt member will be released for said movement away from said control-member portion.

3. A lock device according to claim 1, wherein said first bolt portion has an enlarged end portion and said second bolt portion is provided with an appropriate recess adapted to engage said end portion, further comprising spring means interposed between said first and said second bolt portions for urging the former toward said control-member portion and the latter toward said cam barrel, against the action of the loading spring which is interposed between said second bolt portion and said housing.

References Cited in the file of this patent

UNITED STATES PATENTS

| | | |
|---|---|---|
| 1,736,900 | Carpenter | Nov. 26, 1929 |
| 2,101,446 | Neiman | Dec. 7, 1937 |
| 2,148,609 | Edwards | Feb. 28, 1939 |
| 2,222,900 | Fruns | Nov. 26, 1940 |

FOREIGN PATENTS

| | | |
|---|---|---|
| 694,113 | Germany | July 25, 1940 |
| 881,006 | Germany | June 25, 1953 |
| 795,833 | Great Britain | May 28, 1958 |

UNITED STATES PATENT OFFICE
CERTIFICATE OF CORRECTION

Patent No. 3,132,503                  May 12, 1964

Christian Pieck et al.

It is hereby certified that error appears in the above numbered patent requiring correction and that the said Letters Patent should read as corrected below.

In the grant, lines 2 and 12, and in the heading to the printed specification, line 4, name of assignee, for "Nieman & Co. KG.", each occurrence, read -- Neiman & Co. KG. --.

Signed and sealed this 27th day of October 1964.

(SEAL)
Attest:

ERNEST W. SWIDER
Attesting Officer

EDWARD J. BRENNER
Commissioner of Patents